(12) United States Patent
Ademe (10) Patent No.: US 10,078,029 B2
(45) Date of Patent: Sep. 18, 2018

(54) SYSTEM FOR TESTING AN ARTICLE WRAPPED WITH AN OVERWRAP AND ASSOCIATED METHOD

(71) Applicant: R.J. REYNOLDS TOBACCO COMPANY, Winston-Salem, NC (US)

(72) Inventor: Balager Ademe, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 101 days.

(21) Appl. No.: 14/826,333

(22) Filed: Aug. 14, 2015

(65) Prior Publication Data

US 2017/0045411 A1 Feb. 16, 2017

(51) Int. Cl.
*G01M 3/04* (2006.01)
*G01M 3/32* (2006.01)

(52) U.S. Cl.
CPC ............ *G01M 3/04* (2013.01); *G01M 3/3281* (2013.01)

(58) Field of Classification Search
CPC ....... G01M 3/04; G01M 3/3281; G01M 3/329
See application file for complete search history.

(56) References Cited

U.S. PATENT DOCUMENTS

| | | | |
|---|---|---|---|
| 3,695,422 A | 10/1972 | Tripodi | |
| 3,712,112 A * | 1/1973 | Widmer | G01M 3/10 73/37 |
| 4,053,056 A | 10/1977 | Day | |
| 4,445,520 A | 5/1984 | Knight et al. | |
| 4,539,836 A * | 9/1985 | Hester | G01M 3/3272 73/45.4 |
| 4,717,017 A | 1/1988 | Sprinkel, Jr. et al. | |
| 4,807,745 A | 2/1989 | Langley et al. | |
| 4,930,344 A * | 6/1990 | Fleenor | G01M 3/3272 73/49.3 |
| 5,240,117 A | 8/1993 | Focke et al. | |
| 5,333,729 A | 8/1994 | Wolfe | |
| 5,542,529 A * | 8/1996 | Hein, III | B65D 85/1018 206/245 |
| 5,898,104 A * | 4/1999 | Rohrssen | G01M 3/3272 209/540 |

(Continued)

FOREIGN PATENT DOCUMENTS

CN 104 614 136 5/2015

*Primary Examiner* — Natalie Huls
(74) *Attorney, Agent, or Firm* — Womble Bond Dickinson (US) LLP (57) ABSTRACT

A testing system is provided for an article wrapped with an overwrap. The testing system includes first and second receptacle portions cooperating to define a test receptacle having a test fixture therein. The test receptacle is configured to receive the wrapped article. The test fixture is configured to form a seal with the test fixture about a perimeter thereof and to draw a portion of the overwrap away from the article in response to a suction applied in association with the test fixture. A piercing device is configured to form an orifice in the overwrap, within the perimeter, and a fluid between the overwrap and the article, through the orifice, from a fluid source. A pressure and/or a fluid flow change within the test receptacle, externally to the overwrap, is measured with a measuring device to determine whether there is leakage in the overwrap. An associated method is also provided.

24 Claims, 7 Drawing Sheets

(56) References Cited

U.S. PATENT DOCUMENTS

| | | | |
|---|---|---|---|
| 6,020,969 | A | 2/2000 | Struckhoff et al. |
| 6,158,193 | A | 12/2000 | Focke et al. |
| 6,308,556 | B1 * | 10/2001 | Sagi .................... G01M 3/3254 73/40 |
| 6,813,961 | B2 | 11/2004 | Stiller et al. |
| 6,874,623 | B2 | 4/2005 | Bray |
| 7,762,046 | B2 | 7/2010 | Pipes et al. |
| 7,810,377 | B2 * | 10/2010 | Gysi ....................... G01M 3/26 73/40 |
| 8,136,661 | B2 | 3/2012 | Lutzig et al. |
| 9,151,688 | B2 * | 10/2015 | Steele .................... G01M 3/00 |
| 2002/0185141 | A1 | 12/2002 | Heide |
| 2004/0141174 | A1 | 7/2004 | Focke et al. |
| 2007/0102015 | A1 | 5/2007 | Villarinho |
| 2007/0266773 | A1 * | 11/2007 | Mayer ................ G01M 3/3272 73/49.3 |
| 2008/0179204 | A1 | 7/2008 | Lutzig |
| 2008/0230410 | A1 | 9/2008 | Jones et al. |
| 2010/0293106 | A1 | 11/2010 | Rhoads et al. |
| 2012/0120229 | A1 | 5/2012 | Brantley et al. |

* cited by examiner

SYSTEM FOR TESTING AN ARTICLE WRAPPED WITH AN OVERWRAP AND ASSOCIATED METHOD

BACKGROUND

Field of the Disclosure

The present disclosure relates to systems for inspecting articles such as, for example, cigarette packages, which are each wrapped with an overwrap, and associated methods. In particular, aspects of the present disclosure relate to systems and associated methods for testing the integrity of the overwrap wrapping the article.

Description of Related Art

Popular smoking articles such as cigarettes have a substantially cylindrical rod shaped structure and include a charge of smokable material such as, for example, shredded tobacco (e.g., tobacco cut filler) surrounded by a paper wrapper thereby forming a so-called "tobacco rod." It has become desirable to manufacture cigarettes having cylindrical filter elements aligned in an end-to-end relationship with the tobacco rod. Typically, filter elements are manufactured from fibrous materials such as cellulose acetate and plug wrap, and are attached to the tobacco rod using a circumscribing tipping material. Such cigarettes having filter elements are referred to as "filter cigarettes."

Filter cigarettes conventionally have been sold in packages that have a generally rectangular parallelepiped form. Some types of popular cigarette packages have the form of a so-called "hard pack," "crush proof box" or "hinged lid package." Another type of popular cigarette package may have the form of a so-called "soft pack." These conventional cigarette packages are generally configured to maintain a freshness and quality of the cigarettes therein and to protect the cigarettes from adverse environmental conditions that could degrade their freshness and/or quality. Such cigarette packages typically include: (1) an inner foil liner comprising a metal foil laminated to a paper substrate and/or a metalized paper which is wrapped about the cigarettes and folded, but not sealed, at the ends of the cigarettes; (2) a "soft" or "hard" paper or paperboard package which is usually imprinted with brand specific information; and (3) an exterior clear overwrap of a heat sealable polymeric film that is heat sealed about the package and includes at least one seam.

It would be highly desirable to provide a testing system that is configured to inspect and/or test the integrity of the overwrap wrapping the cigarette package. In particular, it would be desirable to provide a testing system that is configured to test the integrity of the overwrap wrapping the cigarette package for leakage in a repeatable, efficient, and/or reliable manner. Further, it would be desirable to provide a testing system that is configured to test the integrity of the overwrap wrapping the cigarette package for leakage in a manner that does not substantially destroy and/or significantly damage the cigarette package itself.

BRIEF SUMMARY OF THE DISCLOSURE

The above and other needs are met by aspects of the present disclosure which, in one aspect, provides a testing system for an article wrapped with an overwrap. Such a system comprises a first receptacle portion and a second receptacle portion configured to be complementarily engaged so as to define a test receptacle therein, wherein the test receptacle is configured to receive and enclose the article wrapped with the overwrap, and the second receptacle portion defines an outlet port and an inlet port. A test fixture is operably engaged with the second receptacle portion, wherein the test fixture is in communication with the inlet and outlet ports of the second receptacle portion and defines a perimeter. The test fixture is configured to contact the overwrap wrapped about the article disposed within the test receptacle, and to form a seal with the overwrap about the perimeter of the test fixture in response to a suction applied through the outlet port of the second receptacle portion. The test fixture is further configured to draw a portion of the overwrap away from the article. A piercing device is operably engaged with the second receptacle portion, wherein the piercing device is configured to form an orifice in a portion of the overwrap within the perimeter of the test fixture and drawn away from the article. A fluid source is operably engaged with the second receptacle portion, wherein the fluid source is configured to direct a fluid into the overwrap, between the overwrap and the article, through the orifice. A measuring device is operably engaged with the first receptacle portion or the second receptacle portion, and is configured to measure a pressure change or a fluid flow change within the test receptacle, and externally to the overwrap wrapped about the article, in response to the fluid being directed into the overwrap from the fluid source, in order to determine whether there is leakage in the overwrap.

Another aspect of the present disclosure provides for a method for testing an article wrapped with an overwrap for leakage in the overwrap. Such a method comprises receiving and enclosing the article wrapped with the overwrap that forms an overwrap wrapped article within a test receptacle defined by a first receptacle portion complementarily engaged with a second receptacle portion, and applying a suction through an outlet port defined by the second receptacle portion so as to form a seal between a test fixture disposed within the test receptacle and the overwrap about a perimeter defined by the test fixture, the test fixture being operably engaged with the second receptacle portion and being in communication with an inlet port and the outlet port defined by the second receptacle portion, and so as to draw a portion of the overwrap away from the article disposed within the test receptacle and into contact with the test fixture. An orifice is formed in the portion of the overwrap, within the perimeter of the test fixture and drawn away from the article, with a piercing device operably engaged with the second receptacle portion. A fluid is directed into the overwrap, between the overwrap and the article, through the orifice, from a fluid source operably engaged with the second receptacle portion. A pressure change or a fluid flow change within the test receptacle, externally to the overwrap wrapped about the article, is measured in response to the fluid being directed into the overwrap from the fluid source, with a measuring device operably engaged with the first receptacle portion or the second receptacle portion, in order to determine whether there is leakage in the overwrap.

These and other features, aspects, and advantages of the disclosure will be apparent from a reading of the following detailed description together with the accompanying drawings, which are briefly described below.

BRIEF DESCRIPTION OF THE DRAWINGS

Having thus described the disclosure in the foregoing general terms, reference will now be made to the accompanying drawings, which are not necessarily drawn to scale, and wherein:

DETAILED DESCRIPTION OF THE DISCLOSURE

The present disclosure will now be described more fully hereinafter with reference to exemplary aspects thereof. These exemplary aspects are described so that this disclosure will be thorough and complete, and will fully convey the scope of the disclosure to those skilled in the art. Indeed, the disclosure may be expressed in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

The present disclosure is directed to systems and methods for rapidly, efficiently, and reliably testing the integrity of an overwrap wrapping an article. Particularly, according to one aspect of the present disclosure, a system may include various components and/or elements configured to test the integrity an overwrap or wrapper wrapping an article such as, for example, a cigarette package.

Filter cigarettes conventionally have been sold in typical cigarette packages having a generally rectangular parallelepiped form with each cigarette package normally containing twenty (20) cigarettes. Some types of popular cigarette packages employ a container having the form of a so-called "hard pack," "crush proof box" or "hinged lid package." See, for example, U.S. Pat. No. 3,874,581 to Fox et al.; U.S. Pat. No. 3,944,066 to Niepmann; and U.S. Pat. No. 4,852,734 to Allen et al.; as well as European Pat. No. 0392737 to Moeller, and U.S. Pat. App. Pub. No. 2008/0230410 to Jones et al., each of which is incorporated in its entirety herein by reference. Other types of popular cigarette packages employ a container having the form of the so-called "soft pack." See, for example, U.S. Pat. No. 3,695,422 to Tripodi; U.S. Pat. No. 4,717,017 to Sprinkel Jr., et al.; and U.S. Pat. No. 5,333,729 to Wolfe, all of which are incorporated herein in their entirety by reference.

These conventional cigarette packages are generally configured and packaged to maintain the freshness and moisture content of the cigarettes and/or to protect the cigarettes from adverse environmental conditions that could degrade their freshness and quality. Such conventional cigarette packages typically comprise three separate wrappings: (1) an inner foil liner comprising a metal foil laminated to a paper substrate or a metalized paper which is wrapped about the cigarettes and folded, but not sealed, at the end of the cigarettes; (2) a "soft" or "hard" paper or paperboard package which is usually imprinted with brand specific information; and (3) an exterior clear overwrap including, for example, a polymeric film which, in some aspects, may be heat sealed about the paperboard package, and have at least one seam.

According to some aspects, an overwrap material wrapping a cigarette package may include an exterior overwrap material such as a type described in U.S. Pat. No. 5,542,529 to Hein, which is incorporated herein in its entirety by reference. In some aspects, an overwrap material may include a film material that may include one or more of a nitrile copolymer or a polypropylene film, which may be metalized or laminated with a thin solid aluminum. The overwrap material may include alumina ($Al_2O_3$)-coated polyethylene terephthalate (PET) film, transparent alumina-coated PET film, silicon oxide-coated PET film, and/or ethylene vinyl alcohol (EVOH)-coated film. Other films characterized as "cellophane-type" film conventionally have been employed for wrapping packaged cigarettes. Overwrap materials may be used such as the types set forth in U.S. Pat. No. 4,807,745 to Langley et al.; U.S. Pat. No. 5,139,140 to Burrows et al.; U.S. Pat. No. 5,542,529 to Hein, III et al.; and U.S. Pat. No. 6,874,623 to Bray, each of which is incorporated herein by reference in its entirety.

Overwrap materials may fully enclose a cigarette package by sealing one end of the overwrap material to another end at a seam. According to some aspects, an overwrap may fully enclose a cigarette package by sealing any and/or all seams of the overwrap material so as to form a sealed environment for the cigarette package. For example, adhesive materials may be used in some aspects to seal the seams of the overwrap material. According to some aspects, an adhesive material may include, for example, a heat-sealing adhesive, a pressure-sensitive adhesive, a tacky adhesive, and/or the like. In some aspects, a low-melting polymer may be used as an adhesive such as, for example, polypropylene, ethylvinylacetate (EVA), ethylbutylacrylate (EBA) and other acrylic copolymers, ethylenevinylacetate maleic anhydride terpolymers, anhydride grafted polyolefins, ethyleneacrylic-ester maleic anhydride or glycidyl methacrylate terpolymers, and/or ionomers. Some examples of lower temperature heat sealing polymers may include HEVA, ethylene acrylic acid (EAA), LEVA, LLDPE, and/or LDPE. In some aspects, adhesives may be water-based and/or able to be applied in an aqueous form (e.g., EVA, EAA, ethylene methacrylate (EMA), ethylene methyl methacrylate (EMMA), polyvinyl alcohol (PVA), ionomer acrylic, polyvinylidene chloride (PVdC)), and additionally and/or alternatively, may be applied in a solvent-based form (e.g., EVA, ethylene methacrylate (EMA), ethylene methyl methacrylate (EMMA), polyvinyl alcohol (PVA), ionomer, acrylic, vinyl, polyester, polypropylene, polyamide). In some aspects, the adhesive may be provided in a solution, emulsion, and/or other applicable forms. Adhesives according to some aspects of the present disclosure may include ultraviolet-curable adhesives, reactive hot melt adhesives (that are applied like a conventional hot melt, but then crosslinked (e.g., moisture-curable polyurethane, silicone)), and/or other materials known for use as sealants and/or adhesives. Adhesive materials may also include those used in other packages such as, for example, in U.S. Pat. No. 7,762,046 to Pipes et al.; U.S. Pat. No. 4,807,745 to Langley; U.S. Pat. No. 5,542,529 to Hein, all of which are incorporated herein by reference in their entirety.

Aspects of the present disclosure provide a system configured to inspect and/or test the integrity of an overwrap material wrapping a cigarette package. Particularly, the system may be configured to test the integrity of the overwrap material and/or any seams, seals, and/or the like associated with the overwrap material, wherein a breach of the integrity by the overwrap and/or seams being broken, damaged or otherwise defective, may result in leaks which, in turn, may allow for contamination of the cigarettes therein. A properly sealed overwrap wrapping a cigarette package can withstand a given internal pressure without rupturing any seams, seals, and/or the like. As such, aspects of the present disclosure provide a system configured to test the integrity of the seams, seals, and/or the like of the overwrap material, as well as the overwrap material itself.

Figure 1:
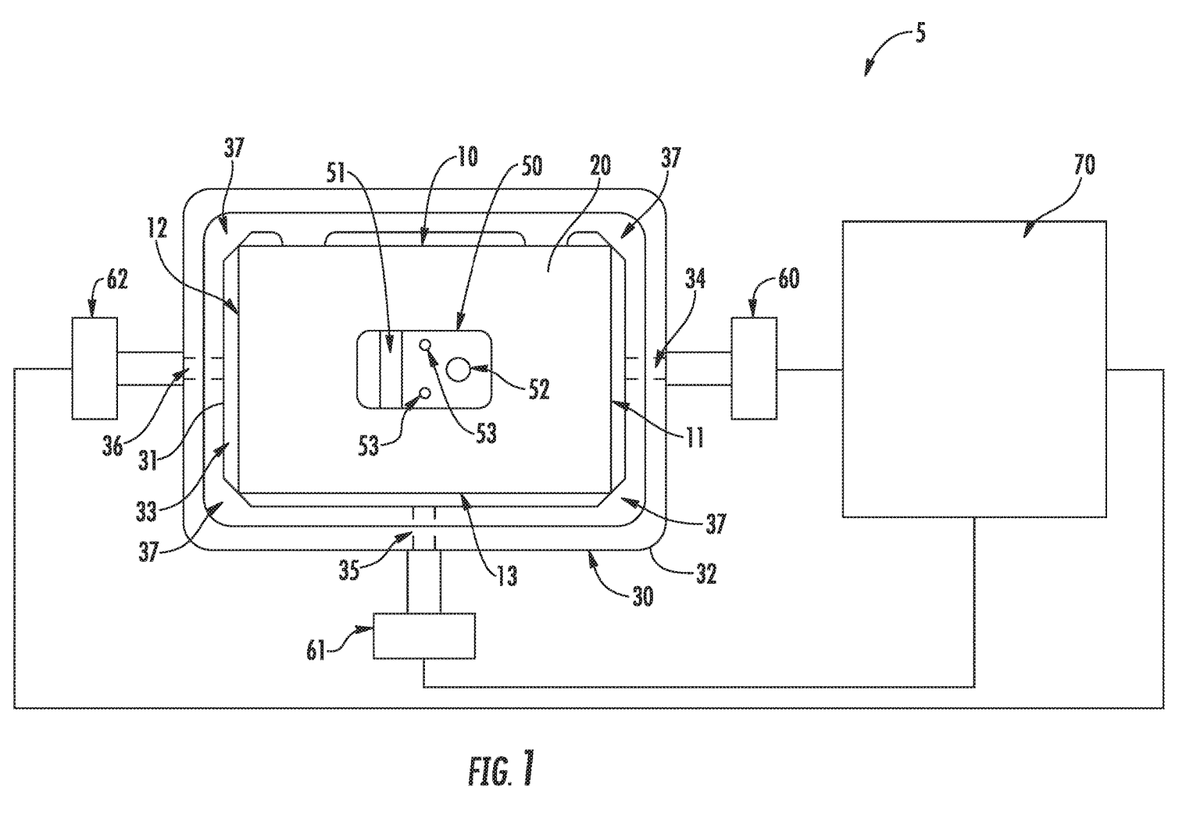
FIG. 1 illustrates a schematic diagram of an example aspect of a testing system configured to test the integrity of an overwrap wrapping an article with some elements such as, for example, a second receptacle portion removed for clarity, according to one aspect of the present disclosure.
Figure 2A:
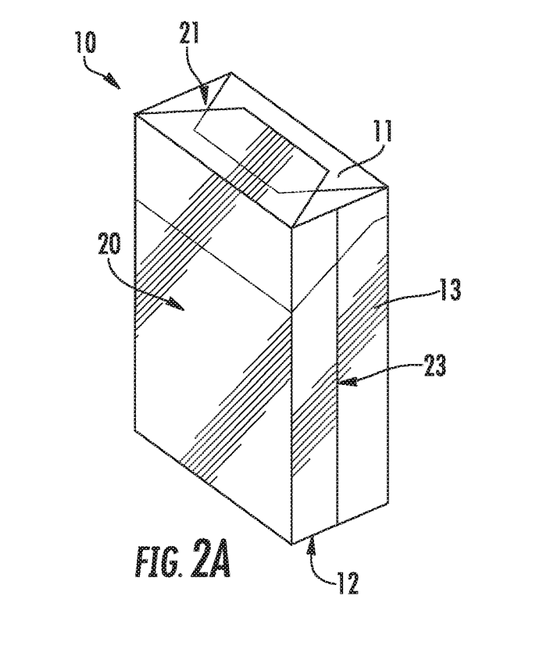
FIG. 2A illustrates a top perspective view of an article wrapped with an overwrap, according to one aspect of the present disclosure.
Figure 2B:
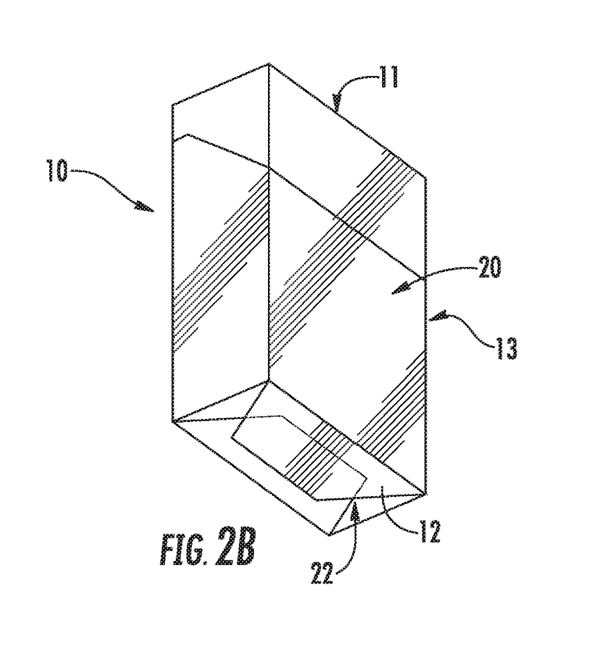
FIG. 2B illustrates a bottom perspective view of an article wrapped with an overwrap, according to one aspect of the present disclosure.

According to one aspect of the present disclosure, as shown in FIG. 1, a testing system 5 is configured to test the integrity of an overwrap, wrapper, and/or the like wrapping an article. In particular, the testing system 5 may be configured to test the integrity of an overwrap 20 wrapped about a cigarette package 10. As shown in FIGS. 2A and 2B, a cigarette package according to one aspect may include opposing first and second end surfaces 11, 12 and at least one longitudinal surface 13 that extends therebetween. As also shown in FIGS. 2A and 2B, the overwrap 20 may include a seam 21 that extends along the first end surface 11 (i.e., the overwrap 20 in the form of a sheet is wrapped about the cigarette package 10 and the opposing ends sealed together to form the seam 21). In some aspects, the overwrap 20 may include a seam 22 that extends along the second end surface 12. In yet another aspect, the overwrap 20 may include seams 21, 22 that extend along both of the opposing first and second end surfaces 11, 12 respectively. According to one aspect, the overwrap 20 may include a seam 23 that extends along at least one longitudinal surface 13 of the cigarette package 10. In some aspects, the seam 23 may extend along the longitudinal surface 13 from the first end surface 11 to the opposing second end surface 12. In some aspects, the overwrap 20 may include seams on each of the opposing first and second end surfaces 11, 12 and on the at least one longitudinal surface 13 that extends between the opposing first and second end surfaces.

Figure 3:
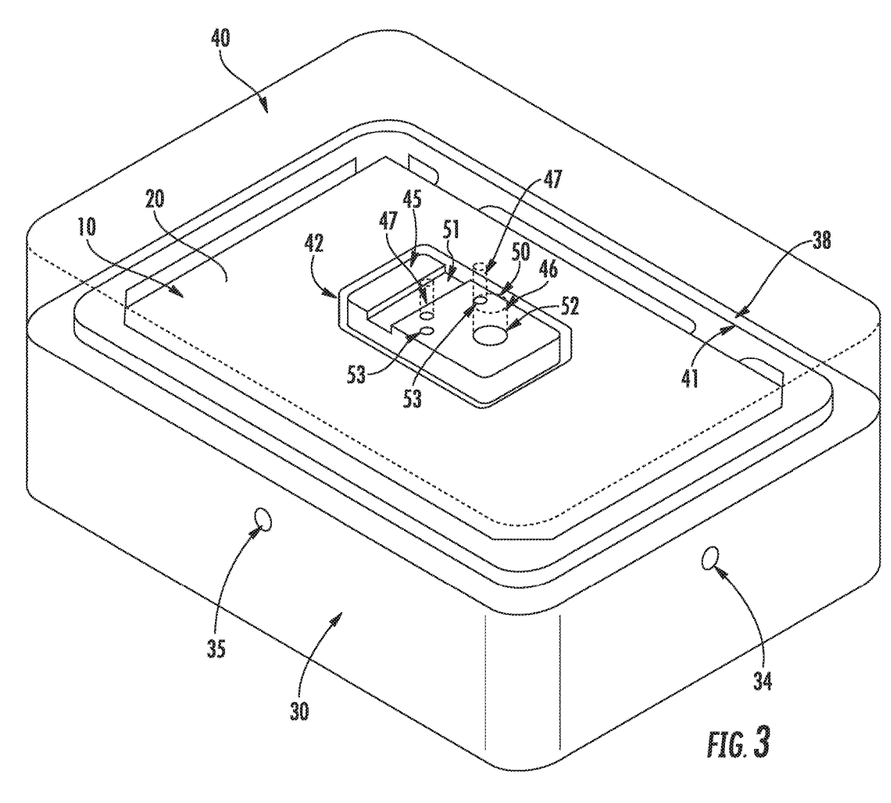
FIG. 3 illustrates a perspective view of a first receptacle portion, a test fixture, a second receptacle portion, and a cigarette package wrapped with an overwrap and placed within the a test receptacle, according to one aspect of the present disclosure.
Figure 4A:
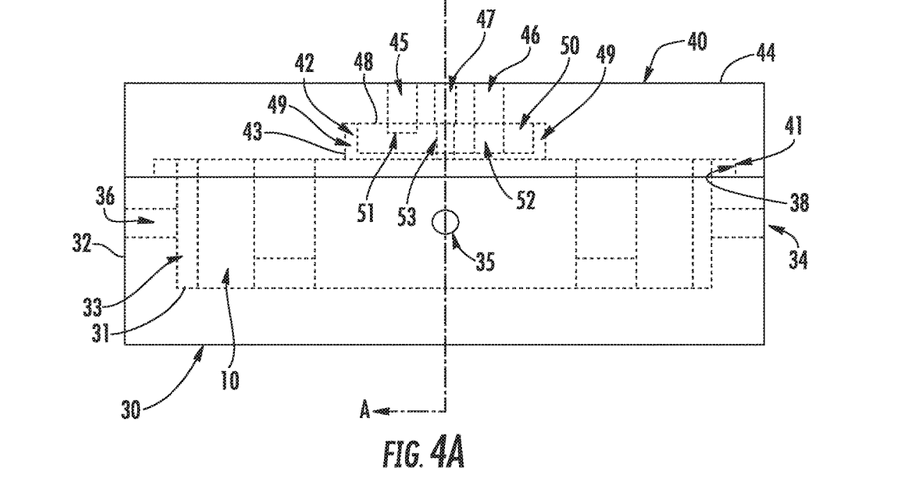
FIG. 4A illustrates a side view of a first receptacle portion, a test fixture, a second receptacle portion, and a cigarette package wrapped with an overwrap and placed within a test receptacle, according to one aspect of the present disclosure.
Figure 4B:
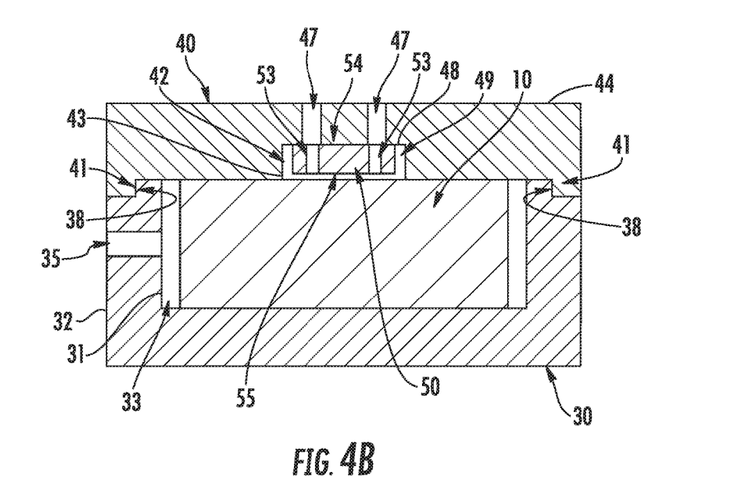
FIG. 4B illustrates a cross-sectional view a first receptacle portion, a test fixture, a second receptacle portion, and a cigarette package wrapped with an overwrap and placed within a test receptacle taken along line A-A of FIG. 4A, according to another aspect of the present disclosure.

As shown in FIGS. 3, 4A, and 4B, the testing system 5 may include a first receptacle portion 30 that is configured to complementarily and operably engage a second receptacle portion 40. The second receptacle portion 40 may include an engagement arrangement 41 configured to facilitate the complementary engagement between the first and second receptacle portions 30, 40. According to one aspect, the engagement arrangement 41 may be configured for a press-fit or friction-fit engagement with a complementary engagement arrangement 38 associated with the first receptacle portion 30. In another aspect, the engagement arrangement 41 of the second receptacle portion 40 and the complementary engagement arrangement 38 of the first receptacle portion 30 may define a snap-fit engagement; however, other types of engagement arrangements (e.g., magnetic, threaded, etc.) are also encompassed by the present disclosure. In one particular aspect, the complementary engagement between the first and second receptacle portions 30, 40 may be configured and arranged so as to form a fluid-tight or air-tight seal therebetween. If necessary or desired, a sealing arrangement (not shown) may be engaged between the first and second receptacle portions 30, 40.

In some aspects, the first and second receptacle portions 30, 40 may be configured to cooperate with one another so as to define a test receptacle 33 therein when engaged. When the first receptacle portion 30 and the second receptacle portion 40 are in engagement with one another so as to define a test receptacle 33, the test receptacle 33 may be configured to receive and/or enclose the wrapped cigarette package 10 or other suitable article therein for testing.

As shown in FIG. 1, the first receptacle portion 30 may at least partially define the test receptacle 33. More particularly, the test receptacle 33 may be at least partially defined by an interior surface 31 of the first receptacle portion 30. According to some aspects, the first receptacle portion 30 may also include at least one securing arrangement 37 configured to position and/or secure the cigarette package 10 within the test receptacle 33 in a testing position (i.e., centered within the test receptacle 33 and spaced apart from the interior surface 31). According to one aspect of the present disclosure, the interior surface 31 may define and/or have operably engaged therewith, at least in part, the at least one securing arrangement 37. The securing arrangement(s) 37 may be configured to operably engage each of the corners of the overwrap wrapped cigarette package (i.e., in a friction fit) so as to securely position the wrapped package in a stationary manner in the testing position. Arranging and/or configuring the securing arrangement(s) 37 to engage each of the corners of the cigarette package 10 may be advantageous in that any potential leaks, tears, openings, apertures, orifices, defects, and/or damage to the overwrap and/or the like are not likely to be blocked by the interior surface 31 and/or another portion of the first and/or second receptacle portions. In particular, the securing arrangement(s) 37 according to one aspect of the present disclosure may secure the cigarette package 10 such that any seams are substantially not in contact with the interior surface 31. As such, the securing arrangement(s) 37 may arrange the cigarette package 10 within the receptacle 33 so as to define a space between the opposing first and second end surfaces 11, 12 of the wrapped cigarette package 10 and the interior surface 31 of the first receptacle portion 30. Likewise, the securing arrangement(s) 37 may arrange the cigarette package 10 within the receptacle 33 so as to define a space between the at least one longitudinal surface 13 of the wrapped cigarette package 10 and the interior surface 31 of the first receptacle portion 30.

Figure 6:
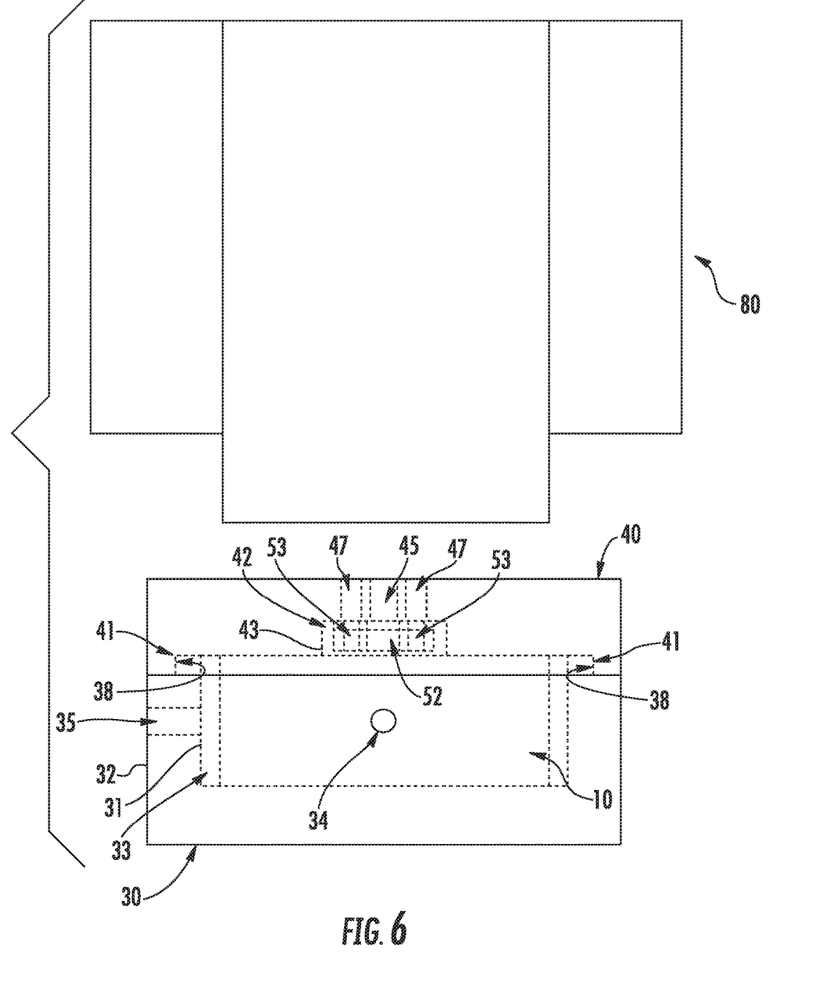
FIG. 6 illustrates some elements of an exemplary testing system configured to test the integrity of an overwrap wrapping an article, according to another aspect of the present disclosure.

According to another aspect, as shown in FIG. 6, the testing system 5 may further include a cigarette package hopper 80. The cigarette package hopper 80 may be configured to deliver a cigarette package 10 wrapped with the overwrap 20 to the test receptacle 33, whether automatically, on demand, or in any other suitable manner. In some instances, the cigarette package hopper 80 may be configured to receive a batch feed of a particular number of overwrap wrapped cigarette packages 10 (i.e., a representative sample of cigarette packages from a production line) for testing. The cigarette package hopper 80 may be operably engaged with the first receptacle portion 30 and configured to automatically insert an overwrap wrapped cigarette package 10 into the test receptacle 33 for securing via the securing arrangement(s) 37. Particularly, the cigarette package hopper 80 may be operably engaged with the first receptacle portion 30 and the second receptacle portion 40 such that a cigarette package 10 provided thereby is inserted, placed, and/or positioned, automatically or manually, in the testing position within the test receptacle 33, and enclosed within the test receptacle 33.

Additionally, the first receptacle portion 30 may further define at least one measuring orifice (e.g., measuring orifices 34, 35, 36) that extends from the interior surface 31 to an exterior surface 32 of the first receptacle portion. As such, the measuring orifices 34, 35, 36 may be arranged and configured to fluidly connect and communicate with the test receptacle 33 defined, at least in part, by the first receptacle portion 30. According to one aspect, the measuring orifices 34, 35, 36 may be configured to fluidly connect and communicate with at least one measuring device (e.g., measuring devices 60, 61, 62) disposed externally to the first receptacle portion 30 and/or configured to receive the at least one measuring device therein such that the at least one measuring device is in fluid communication with the test receptacle 33. Each measuring device 60, 61, 62 may be configured to measure a pressure change and/or a fluid flow change within the test receptacle 33, externally to the overwrap 20 wrapping the article 10, as discussed in further detail herein. Accordingly, in response to a fluid directed into the overwrap 20, between the overwrap 20 and the article 10, and escaping from the overwrap 20 through a defect associated therewith to enter the test receptacle 33, the escaped fluid may flow towards or otherwise be realized by any or all of the measuring device(s) 60, 61, 62 associated with the measuring orifice(s) 34, 35, 36 to indicate a fluid leakage from the overwrap 20.

As shown in FIGS. 4A and 4B, the testing system 5 may further include a test fixture 50 that is operably engaged with the first and/or second receptacle portion 30, 40 and disposed within the test receptacle 33. In one aspect, the second receptacle portion 40 may define a test fixture cavity 42 configured to receive the test fixture 50 therein. In particular, the test fixture cavity 42 may be defined by a perimeter wall or side wall 43 and an end wall 48 of the second receptacle portion 40.

According to some aspects of the present disclosure, the second receptacle portion 40 may further define an outlet port 45 and an inlet port 46 that extend from an exterior surface 44 to an interior of the second receptacle portion (i.e., to within the test receptacle 33), for example, to fluidly connect and communicate a volume disposed externally to the second receptacle portion 40 with the test fixture cavity 42 (i.e., through the end wall 48) and/or with the test receptacle 33.

Figure 5A:
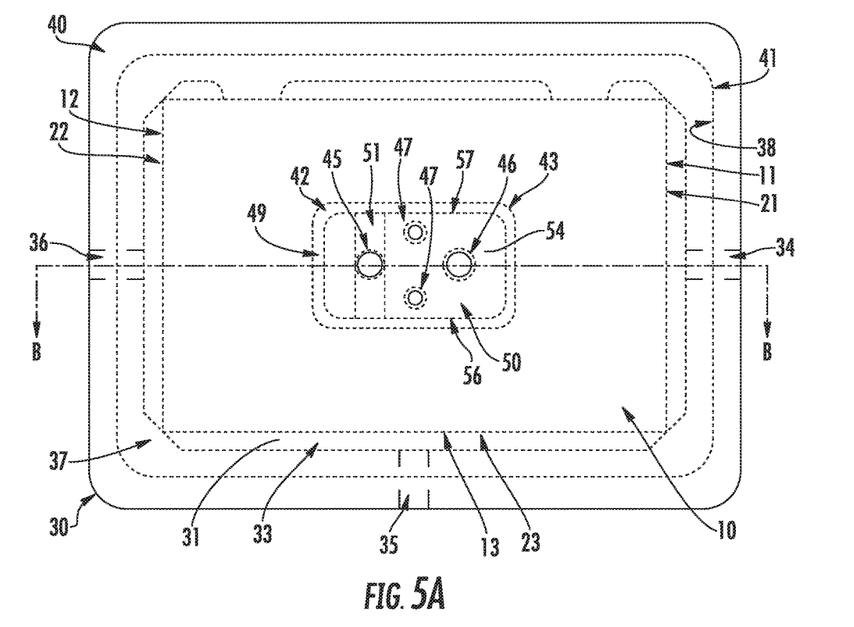
FIG. 5A illustrates a top view of a first receptacle portion, a test fixture, a second receptacle portion, and a cigarette package wrapped with an overwrap and placed within a test receptacle, according to one aspect of the present disclosure.

In some aspects, the test fixture 50 configured to be received within the test fixture cavity 42 may define a perimeter that is shaped and/or sized so as to be smaller than the perimeter of the test fixture cavity 42 defined by the side wall 43. In particular, the perimeter of the test fixture 50 may be defined, in part, by a first and second longitudinal surface 56, 57, as shown in FIG. 5A. Accordingly, when a test fixture 50 is disposed within the test fixture cavity 42, the test fixture 50, or cooperation between the test fixture 50 and the test fixture cavity 42, causes the test fixture 50 to be laterally spaced apart from the side wall 43, or otherwise to be laterally centered within the test fixture cavity 42 such that the test fixture 50 and the side wall 43 define a seal channel 49 therebetween. In some instances, the seal channel 49 may extend about the entire perimeter of the test fixture 50, or the seal channel is at least fluidly continuous about the entire perimeter of the test fixture.

As shown in FIGS. 1, 3, and 5A for example, the test fixture 50 may further define a suction channel 51 that extends laterally across a first lateral surface 54 of the test fixture from a first longitudinal surface 56 to an opposing second longitudinal surface 57, as shown in FIG. 5A so as to provide fluid communication therebetween. In some aspects, the first lateral surface 54 and/or the suction channel 51 are disposed adjacent to the end wall 48 of the test fixture cavity 42 when the test fixture 50 is disposed therein, and the suction channel 51 may be arranged and configured to fluidly connect and communicate with the outlet port 45 defined by the second receptacle portion 40.

Figure 5B:
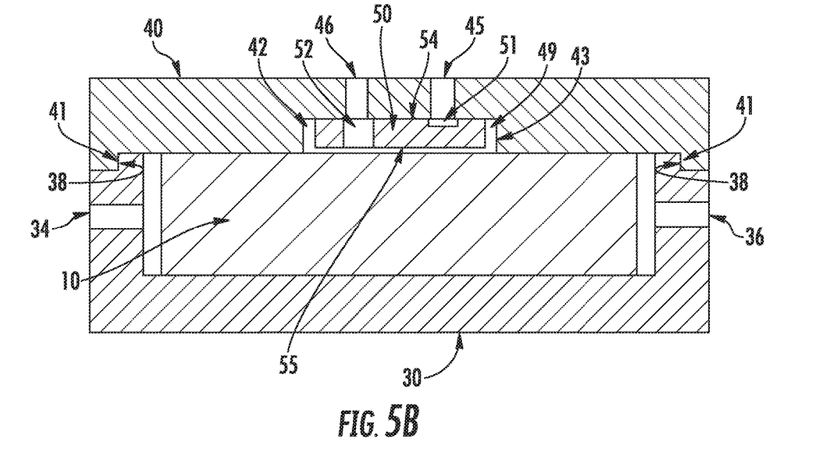
FIG. 5B illustrates a cross-sectional view of a first receptacle portion, a test fixture, a second receptacle portion, and a cigarette package wrapped with an overwrap and placed within a test receptacle taken along line B-B of FIG. 5A, according to another aspect of the present disclosure.

In some aspects, the testing system 5 may be configured to apply a suction force to the test receptacle 33 by way of the outlet port 45. In doing so, the applied suction communicates with the test receptacle 33 through the outlet port 45 and the suction channel 51, such that the suction is applied at the seal channel 49 extending about the perimeter of the test fixture 50. According to some aspects, the test fixture 50 may be in contact with or at least adjacent to the overwrap material 20 wrapping the cigarette package 10 when the cigarette package is disposed in the testing position in the test receptacle 33. As such, the suction force applied at the seal channel 49 extending about the perimeter of the test fixture 50 acts upon the overwrap 20 wrapped about the cigarette package 10 and/or draws the overwrap 20 into contact with the test fixture 50. Continued application of the suction further causes the overwrap 20 to seal the seal channel 49 defined by the side wall 43 and the test fixture 50 such that the seal extends about the perimeter of the test fixture 50 and/or about the perimeter of the test fixture cavity 42 defined by the side wall 43. In doing so, the overwrap 20 may also be sealed to the test fixture 50 within the perimeter of the test fixture. If the securing arrangement 37 secures the overwrap wrapped article 10 in a spaced apart relation with the test fixture 50, and/or if the test fixture 50 is recessed within the test fixture cavity 42 (i.e., does not extend to the end of the side wall 43 away from the end wall 48 as shown, for example, in FIGS. 4A, 4B and 5B), the overwrap 20 is drawn away from the cigarette package 10 so as to form a space therebetween.

According to some aspects, the test fixture 50 may define at least one piercing port 53 that extends from the first lateral surface 54 of the test fixture to a vertically-opposed second lateral surface 55, as shown in FIG. 4B. In some aspects, the piercing port 53 may be arranged and configured to fluidly connect and communicate with at least one piercing port 47 defined by the second receptacle portion 40 (i.e., and extending from the exterior surface 44 through the end wall 48 into the test receptacle 33 so as to be in serial engagement with the piercing port 53 of the test fixture 50 disposed in the test fixture cavity 42).

In such instances, a piercing device (not shown) may be configured to operably engage the second receptacle portion 40 and/or the test fixture 50, via the respective piercing ports 47, 53, so as to be arranged to form an orifice in the overwrap 20 through the piercing ports 47, 53. For example, the piercing device may be configured to extend through the piercing port 47 defined by the second receptacle portion 40 and the piercing port 53 defined by the test fixture 50, so as to engage the overwrap 20 sealed to the test fixture 50, within the perimeter thereof, and form an orifice in the portion of the overwrap 20 within the perimeter. More particularly, the orifice may be formed in the portion of the overwrap 20 within the perimeter of the test fixture 50 and drawn away from the cigarette package 10. The space between the portion of the overwrap 20 being pierced by the piercing device, and the underlying cigarette package 10, thus prevents damage to the cigarette package 10.

According to some aspects, the inlet port 46 of the second receptacle portion and/or the inlet port 52 of the test fixture may function as the respective piercing ports 47, 53, as necessary or desired. As such, the piercing device may be configured to form an orifice in the portion of the overwrap 20 within the perimeter through the inlet port 52 and/or one of the piercing ports 53 of the test fixture, for example, by burning, melting, and/or heating the portion of the overwrap, or otherwise, for example, by puncturing, perforating, piercing, and/or penetrating the portion of the overwrap. Accordingly, once the orifice is formed, at least the inlet port 46 (and/or the piercing port 47) of the second receptacle portion may be fluidly connected with the space between the overwrap 20 and the cigarette package 10 by way of the orifice.

According to some aspects, the system 5 may further include a fluid source (not shown) that may be operably engaged with the second receptacle portion 40. In one aspect, the fluid source may be operably engaged with and configured to fluidly connect and communicate with the inlet port 46 and/or the piercing port 47 of the second receptacle portion 40. The fluid source may be configured to direct a fluid through the inlet port 46 and/or the piercing port 47, through the orifice formed by the piercing device, and into the space between the overwrap 20 and the cigarette package 10. In some instances, the fluid supplied by the fluid source may be at a pressure greater than the pressure within the test receptacle 33.

As shown in FIG. 1, the system 5 may further include at least one measuring device (e.g., measuring devices 60, 61, 62) operably engaged with the first receptacle portion 30 (or second receptacle portion 40, as appropriate). According to some aspects, each measuring orifice 34, 35, 36 may have a corresponding measuring device 60, 61, 62 directly engaged or otherwise in fluid communication therewith. That is a first measuring device 60 may be fluidly connected with a first measuring orifice 34, a second measuring device 61 may be fluidly connected with a second measuring orifice 35, and a third measuring device 62 may be fluidly connected with a third measuring orifice 36, or each measuring device may be directly engaged with and/or disposed within the respective measuring orifices such that each of the first, second, and third measuring devices are fluidly connected and/or are in fluid communication with the test receptacle 33.

According to various aspects, the measuring devices 60, 61, 62 may be configured to measure, for example, a pressure change (i.e., configured as a pressure transducer) or a fluid flow change (i.e., configured as a flow sensor). As such suitable measuring devices may vary and, for example, may include a pressure transducer, an analog pressure sensor, a flow rate sensor, a vane which may be deflected by a fluid flow, a pressure differential switch, and/or the like will be apparent to a person of ordinary skill in the art. The measuring devices can all be of one type or configuration, or can each be of a different type or configuration, as necessary or desired.

According to some aspects, the measuring device(s) (e.g., measuring devices 60, 61, 62) may be in communication with a controller 70 configured to receive a signal such as, for example, an electrical signal, from each of the measuring device(s). The controller 70 may be configured to receive a signal from any of the measuring devices 60, 61, 62, and determine whether any of the measuring devices has detected a pressure change and/or fluid flow change within the test receptacle 33 and externally to the overwrap 20 resulting from the fluid directed into the space between the overwrap 20 and the cigarette package 10. The controller 70 may be configured to determine the pressure change and/or fluid flow change directly from a signal provided by a particular measuring device, or through a relative comparison (e.g., with respect to time) of the signals from any plurality of the measuring devices.

As shown in FIG. 5A, a cigarette package 10 wrapped with an overwrap 20 may be disposed within the test receptacle 33 so that opposing end surfaces 11, 12 are disposed proximate to a first measuring orifice 34 and a longitudinally opposed third measuring orifice 36, respectively. A longitudinal surface 13 that extends between the two opposing end surfaces 11, 12 of the cigarette package 10 may be disposed proximate to a second measuring orifice 35. Accordingly, seams 21, 22 extending along the opposing end surfaces 11, 12, respectively, and the seam 23 extending along the longitudinal surface 13 that extends between the opposing end surfaces 11, 12 may be disposed proximate to the respective measuring orifices 33, 34, 35 and the measuring device(s) associated therewith. As such, the measuring devices 60, 61, 62 may be positioned and arranged adjacent to any seam(s) formed in the overwrap 20 (e.g., since such seams may have a higher risk of defect, damage, or loss of integrity as compared to the sheet or body of the overwrap 20 itself) so as to determine a change in pressure and/or fluid flow originating at any of the corresponding seams 21, 22, 23. For example, if seam 21 was defective, the first measuring device 60 disposed proximate to the defective seam 21 would likely detect a pressure change and/or a fluid flow change before (or instead of) the second and third measuring devices 61, 62. Likewise, the controller 70 may be configured to determine a change in pressure and/or fluid flow at each of the seams 22, 23 adjacent to the second measuring device 61 and third measuring device 62, respectively, if there is a defect or loss of integrity in either of those seams.

By analyzing a wrapped article using such apparatuses and method disclosed herein, it may be possible to correlate the test results so as to trace repetitive defects to a source in the production process. For example, if a leak, defect, or other loss of integrity is discovered in a particular seam of the overwrap, for a particular batch of overwrap wrapped articles, the corresponding machinery within the production process for forming that seam may be targeted for remediation. Moreover, since only the overwrap wrapping the tested articles is altered by the apparatuses and methods disclosed herein, it may be possible to re-work the tested articles, if there is no other defect associated with the cigarette package or the cigarettes disposed therein (i.e., the defective overwrap could be removed and the cigarette packages therein re-directed through the wrapping process for re-testing or for consumer distribution).

Figure 7:
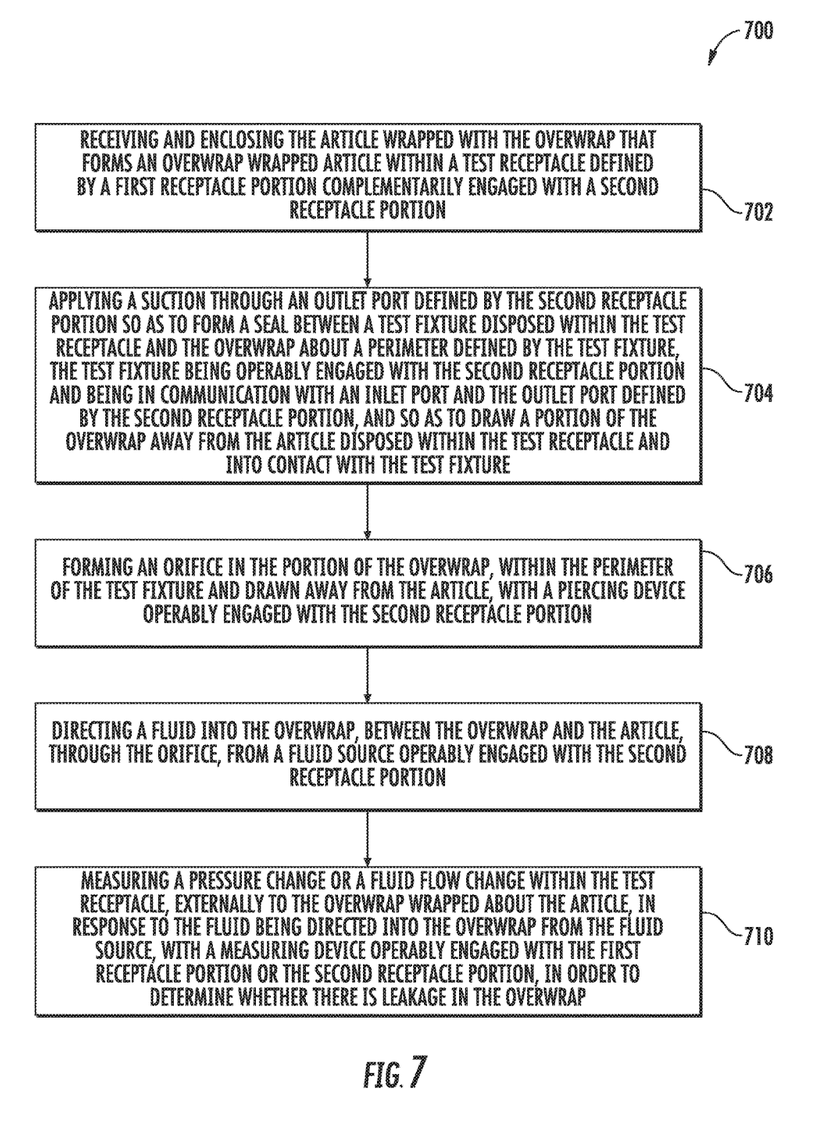
FIG. 7 illustrates a schematic block diagram of a method of testing an overwrap wrapping an article for leakage in the overwrap, according to an example aspect of the present disclosure.

Aspects of the present disclosure may also provide for a method 700 for testing an article such as, for example, a cigarette package 10, wrapped with an overwrap 20. As shown in FIG. 7, a method 700 for testing an article with an overwrap for leaks, damage, punctures, and/or the like may include receiving and enclosing the article wrapped with the overwrap that forms an overwrap wrapped article within a test receptacle defined by a first receptacle portion complementarily engaged with a second receptacle portion (Block 702). A wrapped article such as, for example, an overwrap wrapped cigarette package 10, may be defined by opposing end surfaces 11, 12 with at least one longitudinal surface 13 extending therebetween. Further, according to some aspects, the overwrap 20 wrapping the cigarette package 10 may include a seam 21 that extends along the first end surface 11, a seam 22 that extends along the opposing second end surface 12, and a seam 23 that extends along at least one longitudinal surface 13 of the cigarette package. Accordingly, the method may further include disposing the overwrap wrapped article (e.g., a cigarette package wrapped with the overwrap) within the test receptacle such that the measuring device(s) (e.g., measuring devices 60, 61, 62) operably engaged with the first receptacle portion or the second receptacle portion is proximate to the at least one and/or each of the seams 21, 22, 23. According to some aspects, the method may further include delivering the cigarette package wrapped with the overwrap to the test receptacle from a cigarette hopper operably engaged with the first receptacle portion and/or the second receptacle portion. According to one aspect, the methods may further include securing the overwrap wrapped cigarette package in a testing position within the test receptacle with a securing arrangement operably engaged with the first receptacle portion and/or the second receptacle portion.

In some aspects, the method may further include applying a suction through an outlet port defined by the second receptacle portion so as to form a seal between a test fixture disposed within the test receptacle and the overwrap about a perimeter defined by the test fixture, the test fixture being operably engaged with the second receptacle portion and being in communication with an inlet port and the outlet port defined by the second receptacle portion, and so as to draw a portion of the overwrap away from the article disposed within the test receptacle and into contact with the test fixture (Block 704). As previously mentioned herein, the second receptacle portion 40 may further comprise an end wall 48 and a side wall 43 that cooperate to define a test fixture cavity 42. The test fixture cavity 42 may be configured to receive the test fixture 50 therein such that the test fixture is spaced apart from the side wall so as to define a seal channel 49 therebetween. Additionally, the test fixture 50 may define a suction channel 51 that extends laterally across the first lateral surface 54 of the test fixture from a first longitudinal surface 56 to an opposing second longitudinal surface 57 so as to provide fluid communication therebetween. In addition, the suction channel 51 and/or the first lateral surface 54 may be disposed adjacent to the end wall 48 of the test fixture cavity 42 when the test fixture is disposed therein. Accordingly, the suction channel 51 may be arranged and configured to fluidly connect and communicate with the outlet port 45 defined by the second receptacle portion. As such, the suction channel 51 may be further configured to be in fluid communication between the outlet port of the second receptacle portion and the seal channel 49, and the method may further include realizing a suction in the seal channel such that that seal with the overwrap about the perimeter of the test fixture is formed.

According to some aspects, the method may include forming an orifice in the portion of the overwrap, within the perimeter of the test fixture and drawn away from the article, with a piercing device operably engaged with the second receptacle portion (Block 706). As discussed herein, the piercing device may be operably engaged with the second receptacle portion and/or the test fixture. In particular, the piercing device may be operably engaged with a piercing port 47 defined by the second receptacle portion 40 and a cooperating piercing port 53 defined by the test fixture 50 so as to form the orifice. Additionally or alternatively, the piercing device may be operably engaged with the inlet port 46 defined by the second receptacle portion 40 and the inlet port 52 of the test fixture 50 cooperating therewith, so as to form the orifice.

According to another aspect of the present disclosure, the method may further include directing a fluid into the overwrap, between the overwrap and the article through the orifice, from a fluid source operably engaged with the second receptacle portion (Block 708). In one aspect, the method may include a fluid source directing a fluid (e.g., air) through the inlet port 46 defined by the second receptacle portion 40, through the inlet port 52 defined by the test fixture that is in fluid communication with the inlet port 46, and through the orifice. According to some aspects, the method may include the fluid source directing a fluid (e.g., air) through the inlet port 46 of the second receptacle portion 40, through a piercing port defined by the test fixture 50 and in fluid communication with the inlet port of the second receptacle portion, and through the orifice. As previously mentioned herein, the fluid source may be operably engaged with and configured to fluidly connect and communicate with the inlet port 46 and/or the piercing port 47 of the second receptacle portion 40. Additionally, the fluid source may be configured to direct a fluid through the inlet port 46 and/or the piercing port 47, through the orifice formed by the piercing device, and into the space between the overwrap 20 and the cigarette package 10.

According to another aspect, the method may further include measuring a pressure change or a fluid flow change within the test receptacle, externally to the overwrap wrapped about the article, in response to the fluid being directed into the overwrap from the fluid source, with a measuring device operably engaged with the first receptacle portion or the second receptacle portion, in order to determine whether there is leakage in the overwrap (Block 710). According to some aspects, additional details with regard to the method are evident to one of ordinary skill in the art from the discussion herein regarding the testing system for an article wrapped with an overwrap.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed herein and that modifications and other aspects are intended to be included within the scope of the appended claims. Although specific terms are employed herein, they are used in a generic and descriptive sense only and not for purposes of limitation.

That which is claimed:

1. A testing system for an article wrapped with an overwrap, said system comprising:
a first receptacle portion and a second receptacle portion configured to be complementarily engaged so as to define a test receptacle therein, the test receptacle being configured to receive and enclose the article wrapped with the overwrap that forms an overwrap wrapped article, and the second receptacle portion defining an outlet port and an inlet port;

a test fixture operably engaged with the second receptacle portion, the test fixture being in communication with the inlet and outlet ports of the second receptacle portion and defining a perimeter, the test fixture being configured to contact the overwrap wrapped about the article disposed within the test receptacle, and to form a seal with the overwrap about the perimeter of the test fixture in response to a suction applied through the outlet port of the second receptacle portion, the test fixture being further configured to draw a portion of the overwrap away from the article;

a piercing device operably engaged with the second receptacle portion, the piercing device being configured to form an orifice in a portion of the overwrap within the perimeter of the test fixture and drawn away from the article;

a fluid source operably engaged with the second receptacle portion, the fluid source being configured to direct a fluid into the overwrap, between the overwrap and the article, through the orifice; and a measuring device fluidly engaged with the first receptacle portion or the second receptacle portion, and being configured to measure a pressure change or a fluid flow change within the test receptacle, and externally to the overwrap wrapped about the article, in response to the fluid being directed into the overwrap from the fluid source, in order to determine whether there is leakage in the overwrap.

2. The testing system of claim 1, wherein the overwrap includes at least one seam extending along the article, and wherein the at least one measuring device is fluidly engaged with the first receptacle portion or the second receptacle portion so as to be proximate to the seam when the overwrap wrapped article is disposed in the test receptacle.

3. The testing system of claim 1, wherein the article includes opposing end surfaces and a longitudinal surface extending between the end surfaces, wherein the overwrap includes a seam extending along the longitudinal surface of the article and a seam extending along each of the end surfaces, and wherein the first receptacle portion or the second receptacle portion includes a measuring device fluidly engaged therewith proximate to each of the seams when the overwrap wrapped article is disposed in the test receptacle.

4. The testing system of claim 1, wherein the first receptacle portion and the second receptacle portion are configured to be complementarily engaged such that the test receptacle thereby is configured to receive and enclose a cigarette package wrapped with the overwrap.

5. The testing system of claim 4, further comprising a cigarette package hopper configured to deliver a cigarette package wrapped with the overwrap, which forms an overwrap wrapped cigarette package, to the test receptacle.

6. The testing system of claim 4, further comprising a securing arrangement operably engaged with the first receptacle portion or the second receptacle portion and configured to secure the overwrap wrapped cigarette package in a testing position within the test receptacle.

7. The testing system of claim 1, wherein the fluid source operably engaged with the second receptacle portion is configured to direct the fluid through the inlet port of the second receptacle portion, through an inlet port defined by the test fixture and in fluid communication with the inlet port of the second receptacle portion, and into the overwrap through the orifice.

8. The testing system of claim 1, wherein the fluid source operably engaged with the second receptacle portion is configured to direct the fluid through the inlet port of the second receptacle portion, through a piercing port defined by the test fixture and in fluid communication with the inlet port of the second receptacle portion, and into the overwrap through the orifice.

9. The testing system of claim 1, wherein the piercing device operably engaged with the second receptacle portion is configured to operably engage a piercing port defined by the test fixture, and is cooperable therewith to form the orifice in the portion of the overwrap within the perimeter of the test fixture.

10. The testing system of claim 1, wherein the piercing device operably engaged with the second receptacle portion is configured to operably engage the inlet port defined by the test fixture, and is cooperable therewith to form the orifice in the portion of the overwrap within the perimeter of the test fixture.

11. The testing system of claim 1, wherein the second receptacle portion further comprises an end wall and a side wall cooperating to define a test fixture cavity, the test fixture cavity being configured to receive the test fixture therein such that the test fixture is spaced apart from the side wall so as to define a seal channel therebetween.

12. The testing system of claim 11, wherein the test fixture includes a first surface disposed adjacent to the end wall when the test fixture is received in the test fixture cavity, the first surface defining a suction channel extending therealong, the suction channel being further configured to be in fluid communication between the outlet port of the second receptacle portion and the seal channel such that suction applied through the outlet port is realized in the seal channel to form the seal with the overwrap about the perimeter of the test fixture.

13. A method for testing an article wrapped with an overwrap for leakage in the overwrap, the method comprising:

receiving and enclosing the article wrapped with the overwrap that forms an overwrap wrapped article within a test receptacle defined by a first receptacle portion complementarily engaged with a second receptacle portion;

applying a suction through an outlet port defined by the second receptacle portion so as to form a seal between a test fixture disposed within the test receptacle and the overwrap about a perimeter defined by the test fixture, the test fixture being operably engaged with the second receptacle portion and being in communication with an inlet port and the outlet port defined by the second receptacle portion, and so as to draw a portion of the overwrap away from the article disposed within the test receptacle and into contact with the test fixture;

forming an orifice in the portion of the overwrap, within the perimeter of the test fixture and drawn away from the article, with a piercing device operably engaged with the second receptacle portion;

directing a fluid into the overwrap, between the overwrap and the article, through the orifice, from a fluid source operably engaged with the second receptacle portion; and measuring a pressure change or a fluid flow change within the test receptacle, externally to the overwrap wrapped about the article, in response to the fluid being directed into the overwrap from the fluid source, with a measuring device fluidly engaged with the first receptacle portion or the second receptacle portion, in order to determine whether there is leakage in the overwrap.

14. The method of claim 13, wherein the overwrap includes at least one seam extending along the article, and wherein the method further includes disposing the overwrap wrapped article within the test receptacle such that the measuring device fluidly engaged with the first receptacle portion or the second receptacle portion is proximate to the at least one seam.

15. The method of claim 13, wherein the article includes opposing end surfaces and a longitudinal surface extending between the end surfaces, wherein the overwrap includes a seam extending along the longitudinal surface of the article and a seam extending along each of the end surfaces, and wherein the method further includes disposing the wrapped article within the test receptacle such that a measuring device fluidly engaged with the first receptacle portion or the second receptacle portion is proximate to each of the seams.

16. The method of claim 13, wherein receiving and enclosing the article wrapped with the overwrap within the test receptacle further comprises receiving and enclosing an overwrap wrapped cigarette package within the test receptacle.

17. The method of claim 16 further comprising delivering the overwrap wrapped cigarette package to the test receptacle from a cigarette package hopper operably engaged with the first receptacle portion or the second receptacle portion.

18. The method of claim 16, further comprising securing the overwrap wrapped cigarette package in a testing position within the test receptacle with a securing arrangement operably engaged with the first receptacle portion or the second receptacle portion.

19. The method of claim 13, wherein directing a fluid into the overwrap further comprises directing air through the inlet port of the second receptacle portion, through the inlet port of the test fixture in fluid communication therewith, and through the orifice.

20. The method of claim 13, wherein directing a fluid into the overwrap further comprises directing air through the inlet port of the second receptacle portion, through a piercing port defined by the test fixture and in fluid communication with the inlet port of the second receptacle portion, and through the orifice.

21. The method of claim 13, wherein forming an orifice in the portion of the overwrap within the perimeter of the test fixture further comprises forming an orifice in the portion of the overwrap within the test fixture with the piercing device, the piercing device being operably engaged with a piercing port defined by the second receptacle portion and a cooperating piercing port defined by the test fixture, so as to form the orifice.

22. The method of claim 13, wherein forming an orifice in the portion of the overwrap within the perimeter of the test fixture further comprises forming an orifice in the portion of the overwrap within the perimeter of test fixture with the piercing device, the piercing device being operably engaged with the inlet port of the second receptacle portion and the inlet port of the test fixture cooperating therewith, so as to form the orifice.

23. The method of claim 13, wherein the second receptacle portion further comprises an end wall and a side wall cooperating to define a test fixture cavity, the test fixture cavity being configured to receive the test fixture therein such that the test fixture is spaced apart from the side wall so as to define a seal channel therebetween.

24. The method of claim 23, wherein the test fixture includes a first surface disposed adjacent to the end wall when the test fixture is received in the test fixture cavity, the first surface defining a suction channel extending therealong, the suction channel being further configured to be in fluid communication between the outlet port of the second receptacle portion and the seal channel, and wherein the method further includes realizing a suction in the seal channel such that the seal with the overwrap about the perimeter of the test fixture is formed.

* * * * *